(12) United States Patent
Newbold

(10) Patent No.: US 7,089,193 B2
(45) Date of Patent: Aug. 8, 2006

(54) MULTIPLE PROJECT SCHEDULING SYSTEM

(75) Inventor: Robert C. Newbold, Wallingford, CT (US)

(73) Assignee: Prochain Solutions, Inc., Lake Ridge, VA (US)

( * ) Notice: Subject to any disclaimer, the term of this patent is extended or adjusted under 35 U.S.C. 154(b) by 950 days.

(21) Appl. No.: 09/851,142

(22) Filed: May 9, 2001

(65) Prior Publication Data

US 2002/0169647 A1 Nov. 14, 2002

(51) Int. Cl.
*G06F 17/60* (2006.01)

(52) U.S. Cl. ............................................. 705/9; 705/8

(58) Field of Classification Search ............ 705/7, 705/8, 9
See application file for complete search history.

(56) References Cited

U.S. PATENT DOCUMENTS

| | | | | |
|---|---|---|---|---|
| 5,414,843 | A * | 5/1995 | Nakamura et al. | 707/104.1 |
| 5,671,361 | A * | 9/1997 | Brown et al. | 705/9 |
| 5,890,131 | A * | 3/1999 | Ebert et al. | 705/7 |
| 5,890,134 | A * | 3/1999 | Fox | 705/9 |
| 5,943,652 | A | 8/1999 | Sisley et al. | |
| 5,983,195 | A | 11/1999 | Fierro | |
| 6,038,539 | A | 3/2000 | Maruyama et al. | |
| 6,049,776 | A * | 4/2000 | Donnelly et al. | 705/8 |
| 6,393,410 | B1 * | 5/2002 | Thompson | 705/37 |
| 6,415,259 | B1 * | 7/2002 | Wolfinger et al. | 705/8 |
| 6,446,053 | B1 * | 9/2002 | Elliott | 705/400 |
| 6,678,698 | B1 * | 1/2004 | Fredell et al. | 707/104.1 |

FOREIGN PATENT DOCUMENTS

| WO | WO 9420918 A1 * | 9/1994 |
|---|---|---|
| WO | WO 9904370 A1 * | 1/1999 |

OTHER PUBLICATIONS

Robert "Introduction to Critical Chain Project Management";1998; Prochain Chain Solutions, Inc. pp. 1-10.*
Brucker, Peter, *Scheduling Algorithms, Second Revised and Enlarged Edition*, Springer, New York, 1998, pp. 6-7.
Morton, Thomes E. Pentico, David W., *Heuristic Scheduling Systems*, John Wiley and Sons, Inc., New York, 1993, pp. 52-55 and 62-63.
Pinedo, Michael, *Scheduling Theory, Algorithms, and Systems*, Prentice Hall, Inc., New York, 1995, pp. 13 and 82-85.

* cited by examiner

*Primary Examiner*—Romain Jeanty
(74) *Attorney, Agent, or Firm*—Buchanan Ingersoll PC

(57) ABSTRACT

A method for determining where in time to schedule a project in a computerized system for scheduling multiple projects operates in conjunction with a database composed of schedules for individual projects with resources assigned to some tasks. A user specifies the resources to be used for a new project, the loading caused by projects whose dates are already determined, the earliest possible start times for the new project, and the maximum amount of expansion in flow time (start to finish time) allowed for the new project, with considering inter-project resource contention. The new project is delayed only long enough to allow contention for the selected resources to be resolved, while not violating the flow time expansion restriction.

20 Claims, 5 Drawing Sheets

MULTIPLE PROJECT SCHEDULING SYSTEM

FIELD OF THE INVENTION

The present invention is directed to a computerized system for scheduling multiple projects, and more particularly, to a multiple-project, resource-constrained project scheduling system and a method for determining the earliest feasible time that a project should be in initiated or introduced into an organization.

BACKGROUND OF THE INVENTION

Project management and resource scheduling are important functions that can be applied to a variety of enterprises and business concerns. There are many variables and dependencies that are involved in a project management effort. These variables and dependencies must be managed and resolved in an organized and effective manner to achieve desired and optimal results.

In general, there are three main elements that should be addressed in scheduling a project. First, the project requirements are determined and quantified. These requirements, for example, can include resource availability, manufacturing schedules, engineering milestones and other tasks that must be performed to achieve an end result. These project requirements are then represented in a model or framework to organize and track all of the requirements. There are many types of models that can be used to represent and manipulate these project requirements. For example, these models can take into account factors such as tasks, task interrelationships, precedence relationships, resources and various restrictions on the tasks and resources that make up a project.

The second main element in scheduling a project is an objective function. This objective function determines the relative quality and comparative advantages and disadvantages between various schedule alternatives at different decision points. The objective function can determine which schedule is a "better" schedule and which schedule is a "worse" schedule. Often included in this objective function is what-if analysis to evaluate amongst an array of possible outcomes and scenarios and provide decision support to management and other interested members of an organization. As the name suggests, the objective function expresses the "objectives" of the schedule, usually in mathematical terms and quantities that can be more easily managed and compared to each other.

The third main element in scheduling a project is the actual process for determining task sequences and times. Many processes exist in the prior art for scheduling one or more projects. These processes can support various kinds of modeling capabilities and objective functions. Some of these are heuristically based and some are designed to produce optimal results. Objective functions normally focus on bottom-line results predicted by a schedule. These bottom-line results are typically based on due dates, predicted completion dates, milestone completions and resource productivity. Optimization techniques may also be applied to quantities such as weighted values, a sum or a maximum value in order to arrive at an optimal solution. Another technique used is phase-gate processes. Phase-gate processes establish different project phases. Each phase ends with a gate that may or may not be passed through, depending upon the satisfaction of specific entry or exit criteria.

There are limitations associated with many of these existing techniques. Although the theories underlying these techniques may be sound, in a practical implementation it is often very difficult, if not impossible, to produce a truly optimal schedule. There are numerous reasons for this difficulty. A schedule is at best an imperfect model or representative approximation of reality. Reality is a constantly changing and evolving entity, which often requires constant attention and changes to schedules and their management, further complicating the modeling activity. Furthermore, most practical scheduling problems are "NP-hard", i.e., nondeterministic polynomial, meaning that they are most likely very difficult to solve optimally using a mathematical analysis.

Another complication in project scheduling is that it is quite common for organizations is to have more active projects in place than their resources can easily or effectively accommodate. This can quickly turn into an overload condition where there are insufficient resources available at the necessary or opportune time to have the intended effect. One reason that this problem can occur is that management wants to take advantage of most, if not all, of the new opportunities that currently exist or will exist shortly. Problems can also arise when front-end organizations, like marketing, may have sufficient capacity and resources to propose and define projects. At the same time, however, other organizations, such as new product development and manufacturing, may be currently operating at capacity and/or over-subscribed with work, and cannot handle the new work that marketing is committing them to do. Further in this regard, Little's Law says that work in a system or work-in-process (WIP) is proportional to flow time. In other words, the more work that exists in the organization at a given point in time, the longer the average start-to-finish time for any of the given projects.

There are other, less obvious penalties to having too many active projects occurring simultaneously in an organization. Probably the most significant penalty is the one attributed to multitasking inefficiencies. This occurs when personnel move back and forth between tasks and/or projects without completing any of them. The end result of these multitasking inefficiencies is that the time required to complete any given task can be extended arbitrarily. In a competitive environment where time to market is critical, this arbitrary task extension can be a significant liability and put an organization at a severe competitive disadvantage in the marketplace.

Finally, it is almost a universal truth that all projects will encounter some type of delay, both foreseen and unforeseen. These delays can arise from known or unknown origins and can extend projects significantly.

Once launched, projects progress in ways that may not have been envisioned or planned for in the initial project stages. There are known and unknown events that can introduce all manners of perturbations into the system with correspondingly different results and outcomes. Projects can take on a life of their own, and it becomes difficult to make a decision to terminate them before completion. This usually happens only after significant time, energy and resources have been expended. The termination of a project can be a very stressful, wasteful and time-consuming process. There is a strong need for better control and insight into how and why projects are launched or introduced into an organization to begin with.

There are various quantitative methods that can be used to limit the introduction of new projects into organizations. One method compares the estimates of aggregate resource consumption versus availability, over a given time period. In certain simpler and less complex applications, this method can be very effective. However, there can be surprises and unforeseen results due to its approximate nature and dependency upon estimates.

Another approach is to create detailed schedules for all of the projects. Resource contention is resolved within and between the various project schedules, at least for some of the resources. The objective function attempts to optimize a combination of parameters in order to complete projects as quickly and efficiently as possible. This approach can be reliable, given reasonable project schedules. However, there is a common, practical problem encountered when scheduling projects: how much earlier should a project be started, in order to produce some minimal additional efficiency? For example, it might be possible to begin work on a project a month earlier and, by taking advantage of temporary availability of some resources, thereby advance its completion date by a week. However, this approach may create other disadvantages, due to the fact that there are more concurrent projects in the system. A scheduling system should enable a manager to evaluate the various tradeoffs associated with such an approach.

Therefore, it is desirable to provide a practical and controllable mechanism for limiting the starts of new projects and a method that allows organizations to deal with both capacity issues and work-in-process issues. Given the common real world limitations and operational scenarios that are frequently encountered, such as project opportunities that can arrive at arbitrary times and projects that are hard to control and hard to stop, a very effective way of controlling work-in-process is to control the induction or commencement of new projects in an organization. The present invention achieves this objective through a practical, quantitative means of controlling project starts based on a combination of capacity and project flow times.

SUMMARY OF THE INVENTION

It is an objective of the present invention to provide the user with a tool to resolve conflicts due to path dependencies, resource contention and other restrictions that may exist within individual projects. The present invention is based upon the consideration of the flow time for a project. By providing a flexible means of adjusting the flow time, the management of multiple tasks is facilitated by allowing the work in process to be maintained at acceptable levels. The method can identify resource contention issues for user-selectable resources between projects, and thereby assist the user in the appropriate course of action to take to resolve such issues. Once the issue has been resolved, the invention is able to determine where a project load should be placed in time.

The present invention can also be used to pace or phase in the starts of one or more projects selected by the system user to be introduced into an organization. This enables the user to schedule or reschedule any number of projects using the results of the invention combined with prior status and current update information.

These and other features of the present invention are explained in greater detail hereinafter, with reference to exemplary embodiments of the present invention illustrated in the accompanying drawings.

DETAILED DESCRIPTION

Figure 1:
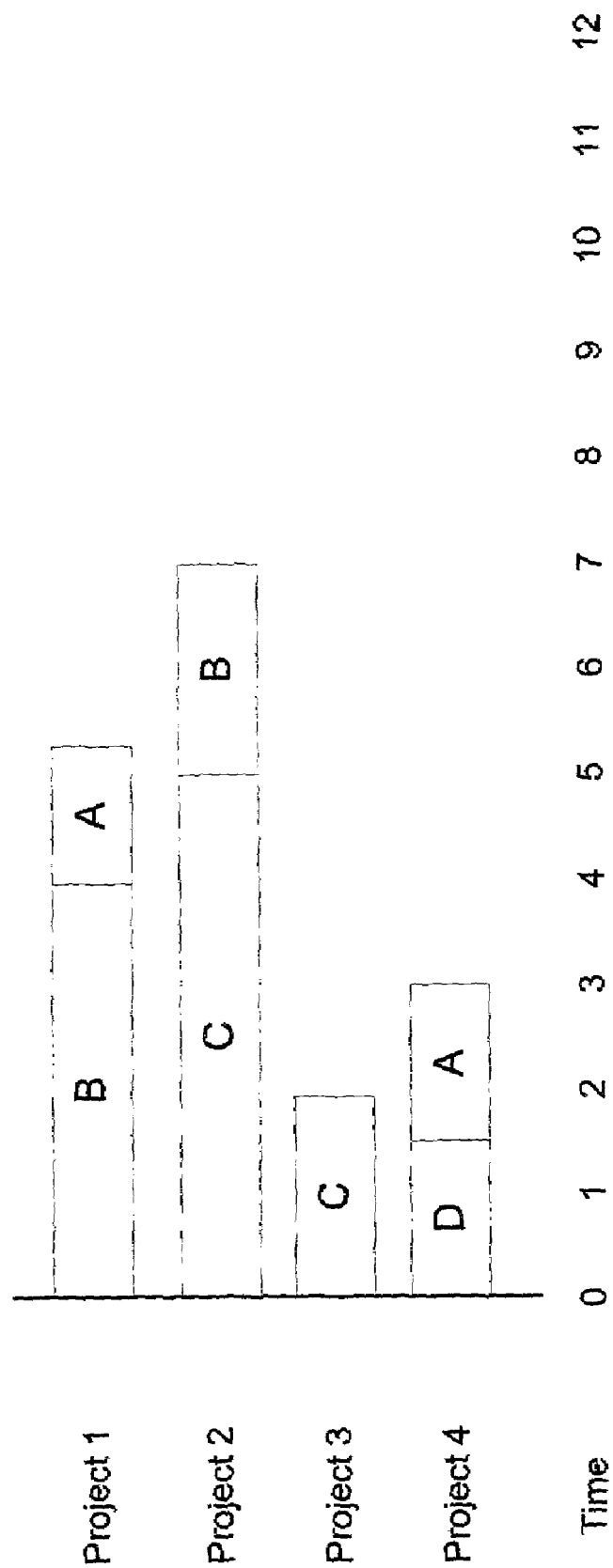
FIG. 1 is a time line illustrating multiple projects that are used as example to explain the invention.

The present invention is directed to environments in which multiple concurrent projects can be ongoing at any time, and new projects need to be scheduled as they arise. The projects could be of any of a variety of different types, such as manufacturing jobs, engineering programs, design schedules, etc. A general overview of multiple projects, to which the principles of the present invention are applicable, is depicted in FIG. 1. This figure illustrates four concurrent projects, each of which comprises multiple tasks. A "task" is any activity that is to be scheduled for a to-be-determined time period. Besides indicating an actual activity, tasks can also represent placeholder or buffer times during which no activity is taking place. In the illustrated example, each task utilizes one of a number of shared resources, denoted by the blocks A, B, C, and D. Each resource could be representative of any one of a variety of different components in the completion of the project, such as a machine that is required to process materials or information, a person with a specialized skill, storage space for raw materials, a testing or quality control laboratory, etc. In the discussion which follows, it is assumed that only one unit (machine, person, etc.) is available for each of the individual resources A, B, C and D. It will be appreciated, however, that any resource could have available more or less than one of the associated units.

The horizontal dimension shown in FIG. 1 is time, and the length of each block represents the amount of time that each resource will be dedicated to a given task. In this example, the time units shown are arbitrary. Those skilled in the art will appreciate that these time increments can be any time increment such as hours, days, weeks, months, etc. In the illustration of FIG. 1, the resource loading for each project is depicted in seriatim, i.e., as if each resource was available as soon as it was needed for the project. In reality, however, each resource can only be employed to work on one task at any given instant. Thus, for example, Project 3 cannot utilize Resource C until it has been released by Project 2. Hence, one issue that should be resolved in any project scheduling system is contention among the various projects for a set R of shared resources. In the present case, Project 3 can be put on hold until such time as the first task of Project 2 is completed and Resource C becomes available.

Figure 2:
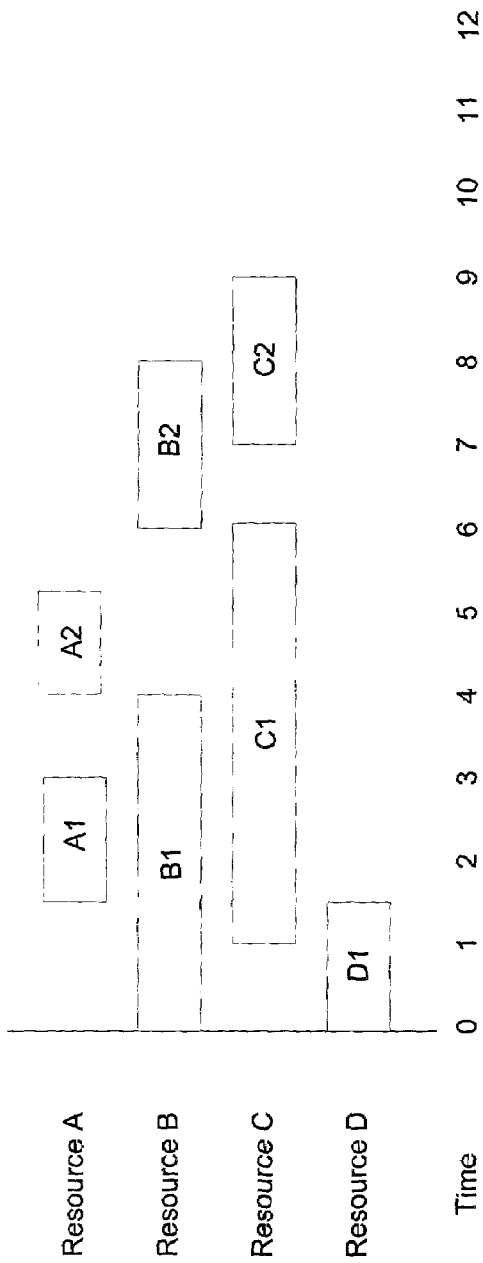
FIG. 2 illustrates an initial resource loading condition for the given set of projects depicted in FIG. 1.

FIG. 2 is a time line which represents the multi-project example of FIG. 1 after the individual resources A–D have been allocated among the projects in such a way that they satisfy both the project requirements (e.g., in Project 1, the task requiring Resource A must follow the task utilizing Resource B) and resource availability. The set of resources can be represented mathematically by R={A, B, C, D}. In the example, there is one unit available for each resource contained in R. The blocks indicated for each resource represent the times that resources are unavailable due to the scheduling of Projects 1–4. Resource A is unavailable for the time increments shown in blocks A1 and A2. Resource B is unavailable for the time increments shown in blocks B1 and B2. Resource C is unavailable for the time increments shown in blocks C1 and C2. Resource D is unavailable for the time increments shown in block D1. Each block might represent actual time for which the resource has been scheduled. Alternatively, a portion of a block, or even an entire block, might be used for buffer time to reserve protective capacity for unscheduled work items that may arise unexpectedly.

The information depicted in FIGS. 1 and 2, i.e. the tasks associated with each project, the amount of time and resources allocated to each task, and the loading of each resource, can be stored in a suitable database (not shown). In addition, this information can be graphically represented to a user on a suitable display, for instance in the manner illustrated in the figures.

Figure 3:
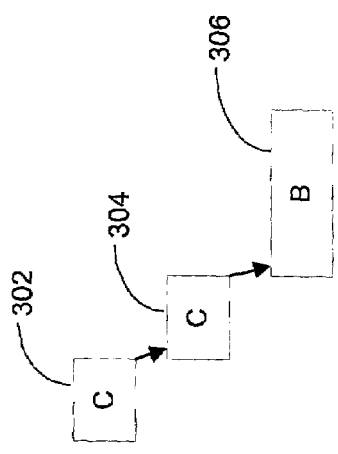
FIG. 3 illustrates a project diagram showing the temporal relation between three tasks for a new project to be scheduled.

As an illustrative example which facilitates an understanding of the present invention, the starting time for a new project as shown in FIG. 3 will be determined. This project consists of two tasks 302 and 304 that each require a single time unit of resource C, and a task 306 requiring two time units of resource B. The arrows between the blocks represent precedence relationships. In this particular case, the second task 304 must start after the first task 302 is completed. The task 306 must start after the second 304 task is completed.

The present invention is based upon consideration of the flow time for a project. In many situations, control over the flow time is significant to the management of multiple tasks since it enables work in process to be maintained at acceptable levels, which in turn facilitates efficient project execution. The following terms and definitions are presented for understanding the present invention prior to the detailed description that follows:

$EPST_i$=earliest possible start time for project i.

$FE_i$=the maximum allowable flow expansion value for project i. The flow expansion value is $\geq 1.0$.

$R=\{r_j\}$=a set of resources for which inter-project contention is being resolved.

$FT_i$ (t,x)=the calculated flow time of project i. It is the start-to-finish duration of the project, typically represented by the difference between completion of the latest task and initiation of the earliest task [(latest task finish)−(earliest task start)] when tasks for project i are scheduled no earlier than time t, taking into account any desired intra-project placement restrictions (including, for example, path dependencies, task durations, resources and task starting or finishing restrictions). Additional factors can be taken into account as well, such as a buffer period after the completion of the last task for the project. When x=true, the loading requirements of projects 1 through i−1 for R are considered when scheduling tasks for project i. As far as possible, project i tasks should not be permitted to cause additional overloads for resources in R. When x=false, loading for R caused by projects 1 through i−1 is not considered.

$PS_i$ (t,x)=the start time at which the earliest task of project i would be scheduled, with t and x as defined above.

CST=current starting time for project i $ST_i$=calculated start time for project i δ=the minimum time to move CST for each iteration of the scheduling process of the present invention.

Figure 4:
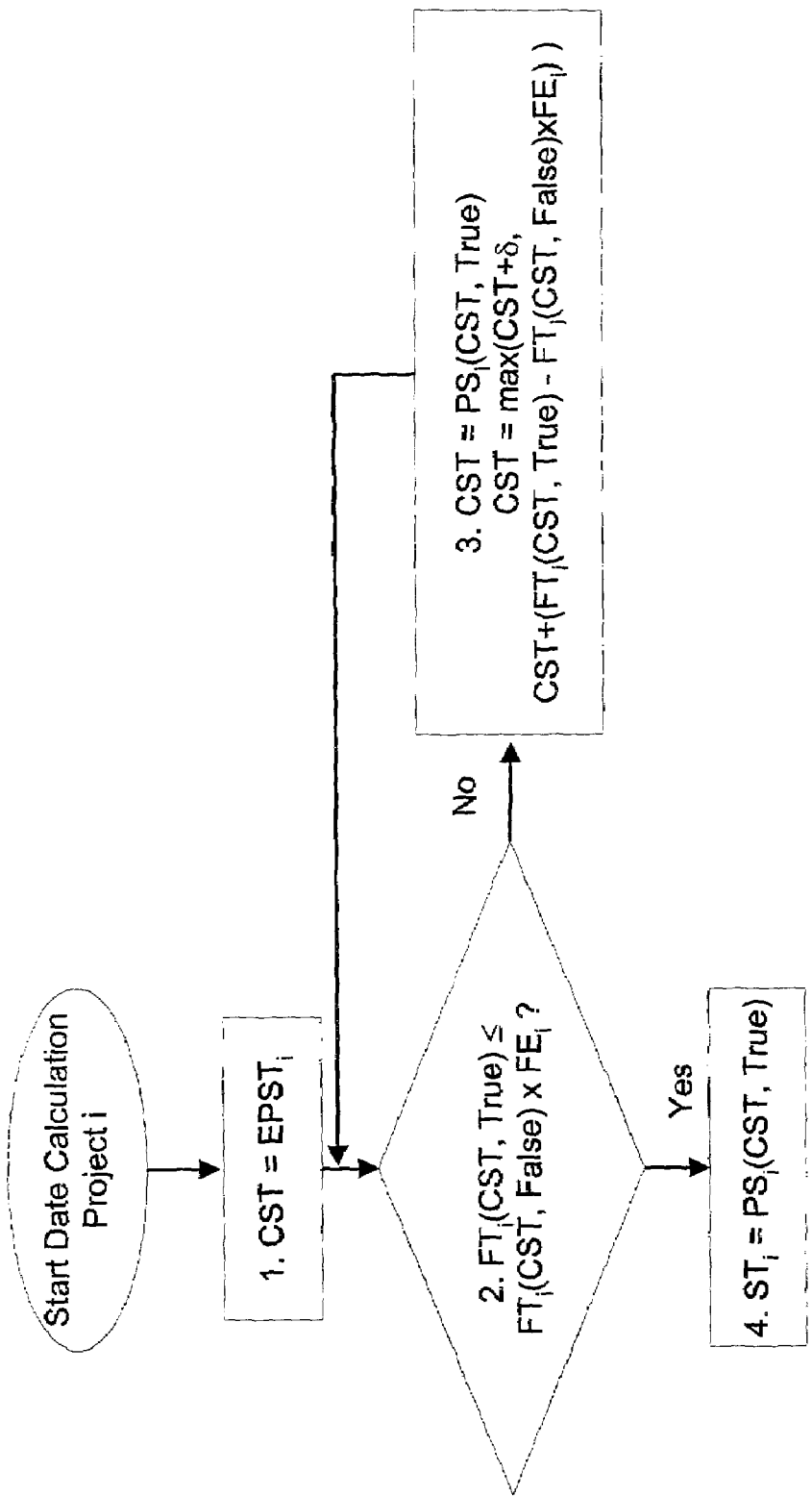
FIG. 4 illustrates the overall process flow for the present invention.

In accordance with the present invention, the maximum allowable flow expansion $FE_i$ is a user-determined value that provides a quantitative, and hence readily perceptible, factor for controlling the scheduling of projects. FIG. 4 is flow chart that illustrates the process for determining the appropriate start time for the project shown in FIG. 3. In order to calculate the start time for project i, step 1 sets the current start time (CST) equal to the earliest permissible start time for project i ($EPST_i$). This serves as an initialization step. Next, in step 2 of FIG. 4 there is a decision that can result in one of two outcomes. The test condition shown in step 2 is: whether the flow time of project i, scheduled to start at time CST and taking into account inter-project resource contention on the selected resources R (i.e., x=true), is less than or equal to the flow expansion coefficient $FE_i$ times the flow time of project i scheduled to start at time CST, without taking into account inter-project resource contention (i.e, x=false).

If the calculation of step 2 results in an answer of NO, this is an indication that the flow time for the project initiated at time CST is too long. Subsequently, the process moves to step 3 of FIG. 4. In step 3, CST is first set equal to the earliest scheduled task start time for project i, using the function $PS_i$ (CST, True). This assignment can be omitted, but it helps to reduce overall processing time when it is employed. CST must then be increased by either the value for δ or the differences of the parameters calculated in step 2, i.e. $FT_i(CST,True)-[FT_i(CST,False) \times FE_i]$, whichever value is larger. Then the flow goes back to step 2 for one or more further iterations.

However, if the result of step 2 results in an answer of YES, then the process moves on to step 4. The start time for project i is set to equal the earliest scheduled task start time for project i, using the function $PS_i$ (CST, True).

For the purposes of the illustrative example depicted in FIGS. 1–3, assume the following initial starting conditions for determining the starting time for the new project:

1. Assume that $EPST_i$ is equal to zero. This means that project i can start as early as time 0.

2. The flow expansion coefficient $FE_i=1.5$. This means that the project's start-to-finish duration will be allowed to expand by up to 50% in order to place the project earlier.

3. The minimum increment to increase CST is 1 time unit, where δ=1.

In step 1 of FIG. 4, CST is set to $EPST_i=0$ as an initial proposed starting time. Then for step 2 of FIG. 4, loading is calculated for resources R with the addition of project i, in order to calculate $FT_i(CST, True)$.

Figure 5:
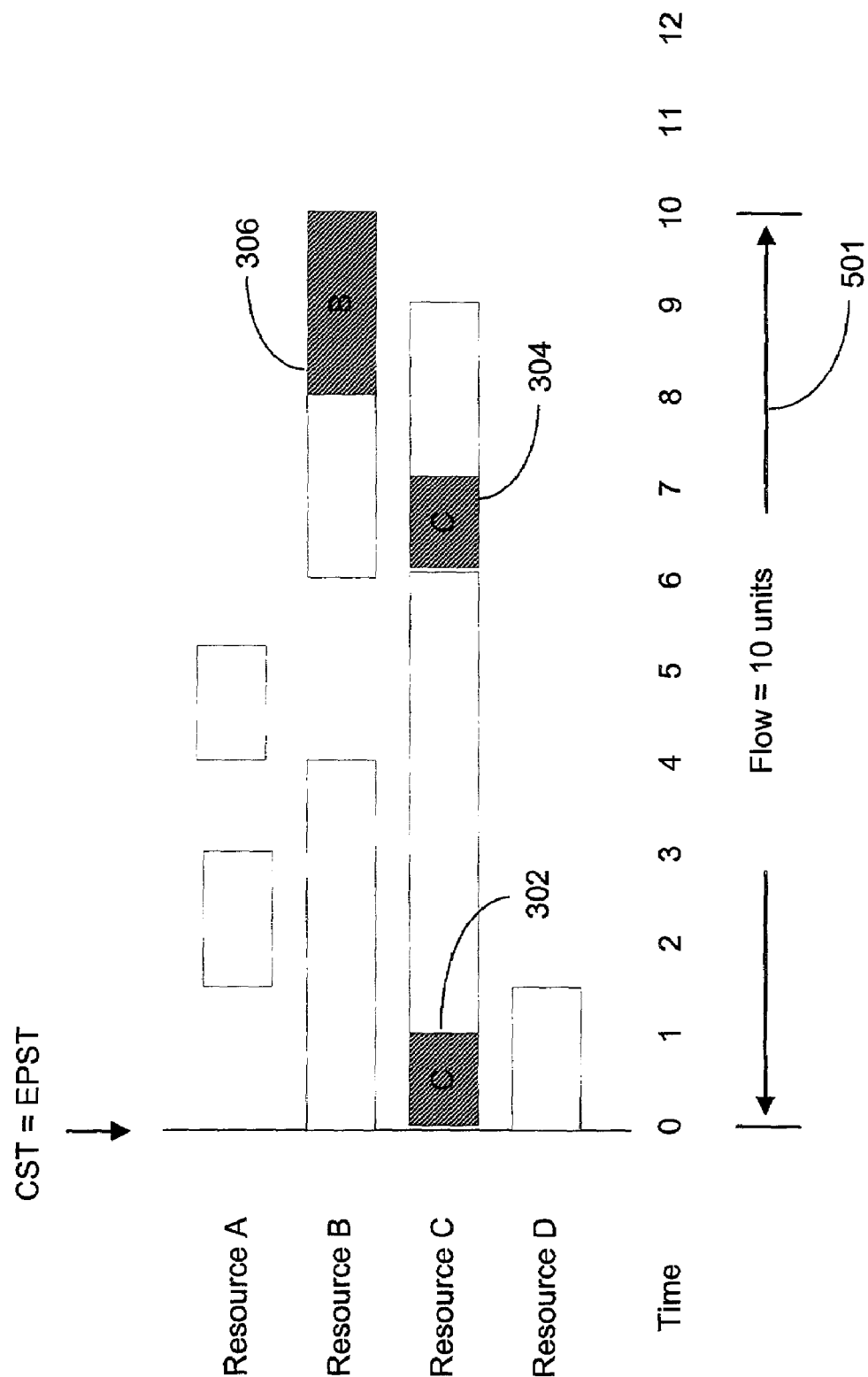
FIG. 5 illustrates an exemplary first iteration of step 2 shown in FIG. 4.

The resulting resource loading condition is shown in FIG. 5. The loading added by the three tasks of project i (302, 304, 306) is shown by the crosshatched areas of FIG. 5.

In FIG. 5, the flow time (501) for project i, taking into account the R resources, equals the time between the start of the first C task (302) and the end of the B task (306). This means that $FT_i$ (CST, True)=10 time units. Without taking into account the resources of R, project i's flow time would be $FT_i$ (CST, False)=4 time units, i.e. the sum of only the shaded areas in FIG. 5. Therefore, the maximum allowable flow time is $FT_i$ (CST, False)$\times FE_i = 4 \times 1.5 = 6$ units. Since this value is less than $Ft_i$ (CST, True)=10, the result of the test in step 2 of FIG. 4 is not true or NO. Therefore, the process continues to step 3 of FIG. 4.

From the above calculations, $FT_i$ (CST, True)−[$FT_i$(CST, False)$\times FE_i$]=4. This is larger than the value of δ. Therefore in step 3 of FIG. 4, CST is incremented by a value of 4 units to establish a new proposed starting time. The process then returns to step 2 for another iteration through the process, the results of which are shown in FIG. 6.

Figure 6:
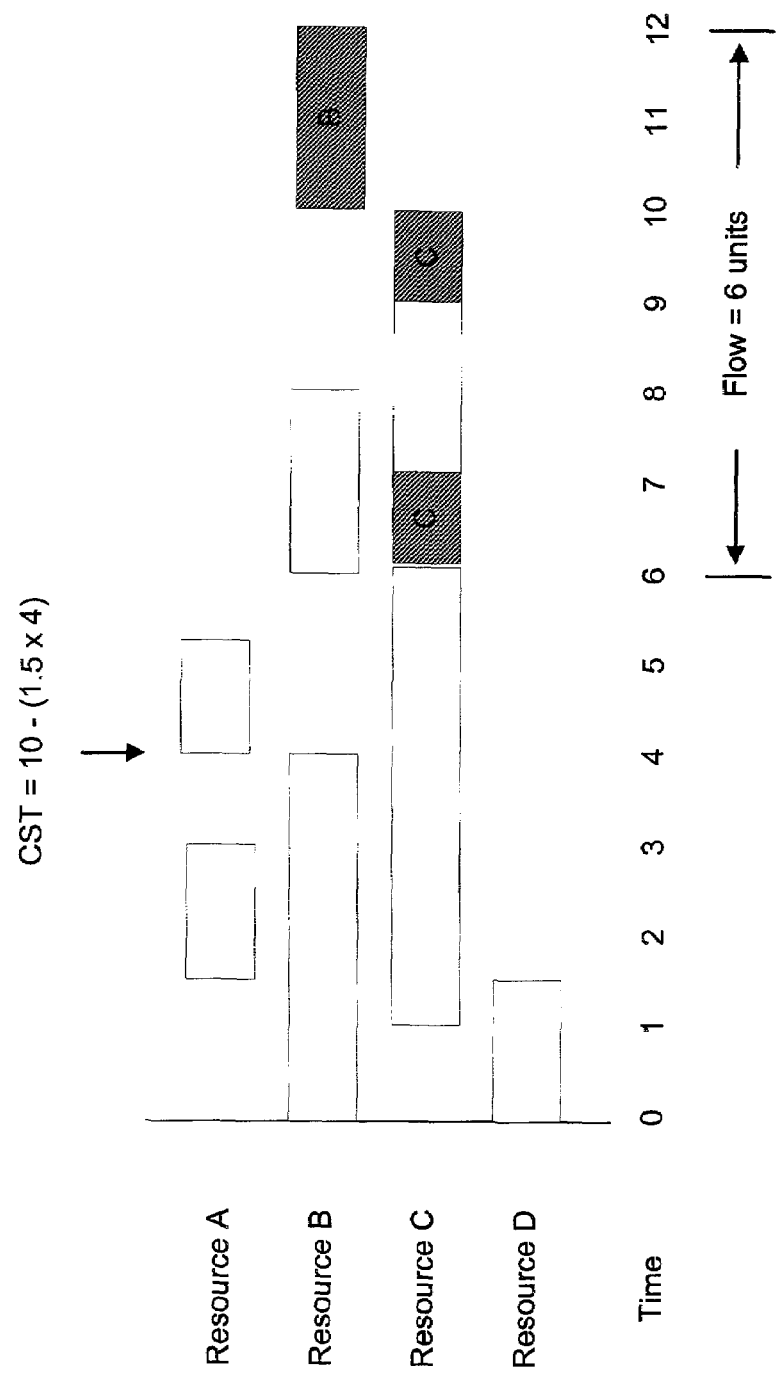
FIG. 6 illustrates an exemplary secondary iteration of the step 2 shown in FIG. 4.

FIG. 6 shows the loading across R during calculations for the second iteration of step 2. The resulting flow time $FT_i$ (CST, True) is 12−6=6. Since $FT_i$ (CST, False) is still 4, the maximum allowable flow time $FT_i$ (CST, False)×$FE_i$=4× 1.5=6 is equal to the calculated flow time $FT_i$ (CST, True)=6. Therefore, the test result from step 2 of FIG. 4 is true or YES, and the process proceeds to step 4 of FIG. 4.

Based on FIG. 6, it can be seen that $PS_i$ (CST, True) equals 6. Therefore in step 4, the calculated start time for the project, $ST_i$ is set equal to $PS_i$ (CST, True)=6. From this calculated start time, the project finish time can then be determined, taking into account the other scheduling information.

In the foregoing example, the proposed new starting time CST is adjusted in Step 3 by adding the value of $FT_i$ (CST, True)−[$FT_i$ (CST, False)×$FE_i$], or δ (whichever is greater), to the prior proposed starting time, i.e. the project is moved to a later time. In some situations, it may be preferable to move the proposed starting time to an earlier point, i.e. to decrement the prior value of CST. For instance, this approach may be used to determine when a project needs to be completed on the basis of the latest projected finish time for projects that are already scheduled. It can be used to determine when work on a project must start in order to complete an entire program that is composed of several individual projects.

Along these same lines, it is also feasible to employ the principles of the invention to a reverse process flow, by utilizing a latest finish time in place of $EPST_i$, and calculate an appropriate starting time which ensures that the project will be finished by that time.

Other variants of the invention are also possible. For instance, to increase the speed of calculation, the value for flow time without resource contention, $FT_i$(CST, False), can be approximated from the earliest permissible start time by determining the value for $FT_i$($EPST_i$, False), rather than recalculate it each time. For similar reasons, it may be preferable to set $ST_i$ equal to CST, rather than $PS_i$(CST, True), in Step 4 of FIG. 5.

In the foregoing example, the calculated start time $ST_1$, is represented in terms of an absolute value, e.g. time 0, time 6, etc. As an alternative, it can be represented as an offset from the start time of one or more other projects, e.g. $ST_i=ST_{i-1}+5$.

One embodiment of this invention can be embedded in a computerized project scheduling system that allows management, synchronization, tracking and what-if analyses for multiple projects. Single project scheduling can be part of such a system. In addition, the present invention can form a core piece of the system, and used to determine how projects will be paced over time.

It will be appreciated by those of ordinary skill in the art, that the present invention can be embodied in other forms without departing from the spirit or essential characteristics thereof. The foregoing description is considered illustrative and not restrictive. The scope of the invention is indicated by the following claims, and all changes that come within the meaning and range of equivalents are therefore intended to be embraced therein.

What is claimed is:

1. A computer-implemented method for scheduling a project, comprising the steps of:
   i) determining resources required to perform the project and an amount of time to be allocated to each resource;
   ii) calculating, in a computer, a first flow time value for completing the project when there are no inter-project constraints on the resources;
   iii) defining a flow expansion coefficient value for the project;
   iv) designating a proposed start time for the project;
   v) calculating, in the computer, a second flow time value for completing the project from said proposed start time, in accordance with existing inter-project constraints on the resources;
   vi) determining, in the computer, whether said second flow time is greater than the product of said first flow time and said coefficient value;
   vii) determining a new proposed start time if said second flow time is greater than said product;
   viii) iteratively repeating steps v–vii until said second flow time is less than or equal to said product; and
   ix) setting the start time for the project in accordance with the proposed start time designated during the final iteration of steps v–vii.

2. The method of claim 1, wherein said new proposed start time is determined in the computer during step vii by adjusting the prior start time by an amount equal to the difference between said second flow time and said product.

3. The method of claim 2 further including the step of defining a minimum amount of time for incrementing the proposed start time, and adjusting the prior start time by the larger of said minimum and said difference.

4. The method of claim 2 wherein step vii includes the steps of setting the new proposed start time to a preliminary value equal to the start time at which the earliest task of said project would be scheduled in accordance with the prior start time and existing inter-project constraints on the resources, and then adjusting said preliminary value in accordance with said difference.

5. The method of claim 2 wherein said new proposed start time is determined by adding said difference to the prior proposed start time, so that the new proposed start time is later than the prior proposed start time.

6. The method of claim 2 wherein said new proposed start time is determined by subtracting said difference from the prior proposed start time, so that the new proposed start time is earlier than the prior proposed start time.

7. The method of claim 6, wherein a project start time is obtained by reversing the process flow and determining a latest project finish time.

8. The method of claim 1, wherein said project is a set of manufacturing activities.

9. A system for determining the start time of a project in a multiple project environment, comprising:
   means for storing an amount of time to be allocated to each resource required to perform the project;
   means for receiving a user-defined flow expansion coefficient value;
   means for calculating whether the product of said flow expansion coefficient value and a first flow time for completing the project in the absence of inter-project constraints on the resources is greater than a second flow time for completing the project when existing inter-project constraints on the resources are considered, for a given start time; and
   means for designating a different start time if said product is not greater than or equal to said second flow time.

10. The system of claim 9 wherein said designating means iteratively designates different start times on an incremental basis until said product is greater than or equal to said second flow time.

11. The system of claim 10 wherein said incremental basis is equal to the difference between said second flow time and said product.

12. The system of claim 11 wherein said incremental basis is equal to the greater of said difference and a predetermined minimum value.

13. The system of claim 10 wherein said different start times are successively later in time.

14. The system of claim 10 wherein said different start times are successively earlier in time.

15. A computer-readable medium containing a program for determining the start time of a project in a multiple project environment, that causes a computer to execute the following steps:
   calculating whether the product of a user-defined flow expansion coefficient value and a first flow time for completing the project in the absence of inter-project constraints on resources required to perform the project is greater than a second flow time for completing the project when existing inter-project constraints on the resources are considered, for a given start time; and
   calculating a different start time if said product is not greater than or equal to said second flow time.

16. The computer-readable medium of claim 15 wherein said program iteratively calculates different start times on an incremental basis until said product is greater than or equal to said second flow time.

17. The computer-readable medium of claim 16 wherein said incremental basis is equal to the difference between said second flow time and said product.

18. The computer-readable medium of claim 17 wherein said incremental basis is equal to the greater of said difference and a predetermined minimum value.

19. The computer-readable medium of claim 16 wherein said different start times are successively later in time.

20. The computer-readable medium of claim 16 wherein said different start times are successively earlier in time.

* * * * *